US012578025B2

(12) United States Patent
Beuschel et al.

(10) Patent No.: US 12,578,025 B2
(45) Date of Patent: Mar. 17, 2026

(54) PNEUMATIC VALVE

(71) Applicant: Conti Temic microelectronic GmbH, Ingolstadt (DE)

(72) Inventors: Michael Beuschel, Stammham (DE); Stefan Bauer, Engelbrechtsmünster (DE); Alexander Kerler, Titting (DE); Christian Ternes, Gaimersheim (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 3 days.

(21) Appl. No.: 18/845,654

(22) PCT Filed: Feb. 20, 2023

(86) PCT No.: PCT/DE2023/200036
§ 371 (c)(1),
(2) Date: Sep. 10, 2024

(87) PCT Pub. No.: WO2023/169634
PCT Pub. Date: Sep. 14, 2023

(65) Prior Publication Data
US 2025/0198519 A1      Jun. 19, 2025

(30) Foreign Application Priority Data
Mar. 10, 2022   (DE) ..................... 10 2022 202 438.9

(51) Int. Cl.
*F16K 11/044*       (2006.01)
*B60N 2/90*        (2018.01)
(Continued)

(52) U.S. Cl.
CPC ............ *F16K 11/044* (2013.01); *B60N 2/914* (2018.02); *F16K 15/144* (2013.01);
(Continued)

(58) Field of Classification Search
USPC ................................................... 137/522, 523
See application file for complete search history.

(56) References Cited

U.S. PATENT DOCUMENTS

| | | | | | |
|---|---|---|---|---|---|
| 3,613,732 | A | * | 10/1971 | Willson | .................. F03G 7/066 |
| | | | | | 60/527 |
| 3,974,844 | A | * | 8/1976 | Pimentel | .............. F16K 31/385 |
| | | | | | 251/282 |

(Continued)

FOREIGN PATENT DOCUMENTS

| | | | |
|---|---|---|---|
| DE | 102011102701 B4 | 10/2013 | |
| DE | 102012212686 A1 | 1/2014 | |

(Continued)

OTHER PUBLICATIONS

Office Action dated Aug. 3, 2022 from corresponding German patent application No. 10 2022 202 438.9.

(Continued)

*Primary Examiner* — Matthew W Jellett

(57) ABSTRACT

A pneumatic valve comprises a housing with an air chamber having supply, connecting and discharge openings. An actuator with a movable closing element is arranged in the housing, featuring a plunger, which projects through the discharge opening with a plate and a first sealing element for closing the discharge opening with an elastic element which, in the activated state, presses said sealing element against the discharge opening The actuator is in the form of an SMA actuator, wherein the actuator element is configured to, in a non-energized state, bring the actuating element to a first state in which it presses the plunger against the supply opening, and to, in an energized state, bring the actuating element to a second state in which the actuating portion does not exert any force on the plunger, wherein a second sealing element is arranged in the air chamber and functions as a check valve.

16 Claims, 5 Drawing Sheets

Figure 1:
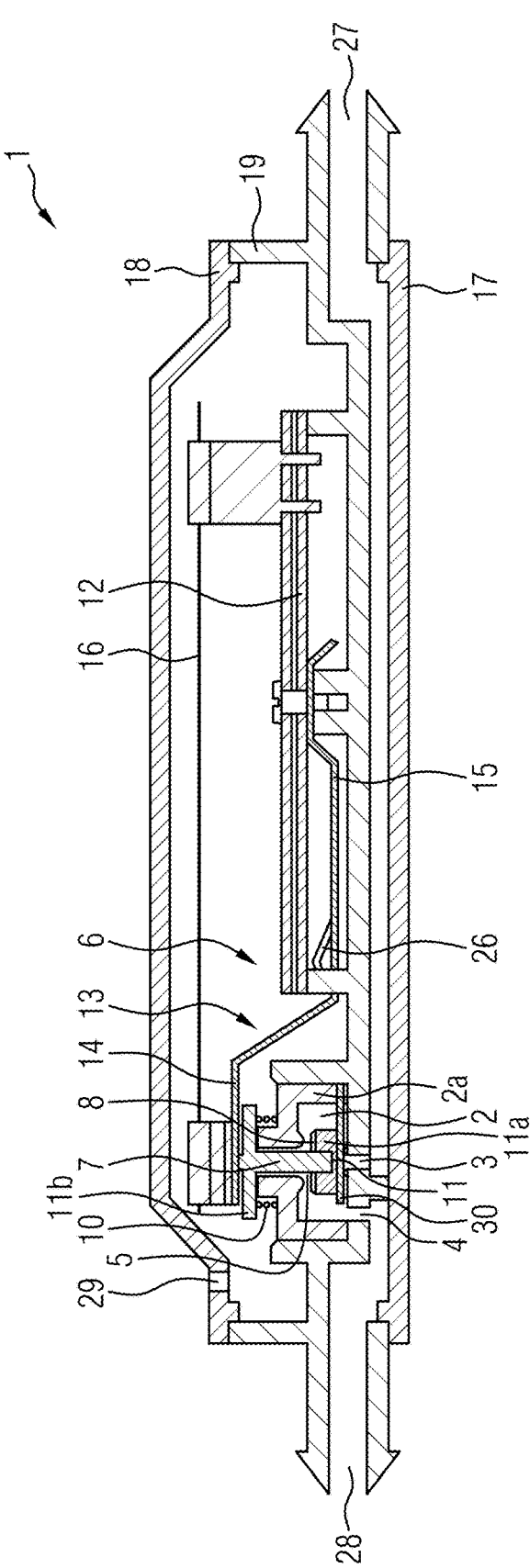

(51) Int. Cl.

| | |
|---|---|
| *F16K 15/14* | (2006.01) |
| *F16K 15/16* | (2006.01) |
| *F16K 15/18* | (2006.01) |
| *F16K 31/02* | (2006.01) |

(52) U.S. Cl.
CPC .......... *F16K 15/1441* (2021.08); *F16K 15/16* (2013.01); *F16K 15/161* (2021.08); *F16K 31/02* (2013.01); *F16K 15/182* (2021.08); *F16K 15/1825* (2021.08); *Y10T 137/7876* (2015.04); *Y10T 137/7877* (2015.04)

(56) References Cited

U.S. PATENT DOCUMENTS

| | | | | |
|---|---|---|---|---|
| 10,753,494 | B2 * | 8/2020 | Beuschel | .............. F16K 11/052 |
| 2003/0095883 | A1 * | 5/2003 | Hauser | .................. F16K 15/162 |
| | | | | 137/856 |
| 2006/0196565 | A1 | 9/2006 | Pechtold | |
| 2016/0190612 | A1 * | 6/2016 | Curello | .............. H01M 8/0432 |
| | | | | 137/12 |
| 2019/0353266 | A1 * | 11/2019 | Dörfler | .............. F16K 27/0209 |
| 2019/0353270 | A1 * | 11/2019 | Dörfler | .................... B60N 2/99 |
| 2020/0103047 | A1 * | 4/2020 | Beuschel | ............. F16K 31/025 |

FOREIGN PATENT DOCUMENTS

| | | | | |
|---|---|---|---|---|
| DE | 102013220563 | A1 | 4/2015 | |
| DE | 102017213736 | B3 | 10/2018 | |
| DE | 102017213744 | B3 | 10/2018 | |
| DE | 102017118260 | A1 | 2/2019 | |
| DE | 102018112090 | A1 | 11/2019 | |
| DE | 102018216874 | A1 | 4/2020 | |
| DE | 102018216876 | A1 | 4/2020 | |
| DE | 102019208051 | A1 | 12/2020 | |
| DE | 102019214245 | A1 | 3/2021 | |
| DE | 102021203190 | A1 | 10/2022 | |
| EP | 2361800 | B1 | 4/2013 | |
| GB | 2146411 | A * | 4/1985 | .......... F16K 31/025 |

OTHER PUBLICATIONS

International Search Report and Written Opinion dated May 25, 2023 from corresponding International patent application No. PCT/DE2023/200036.

* cited by examiner

PNEUMATIC VALVE

The invention relates to a pneumatic valve, having a housing in which an air chamber with a supply opening for supplying compressed air into the air chamber, a connecting opening for connecting the air chamber to an air cushion and a discharge opening for discharging compressed air from the air chamber is formed, wherein an actuator with a movable closing element is arranged in the housing, wherein the closing element is formed with a plunger, which projects through the discharge opening and has formed at the end thereof projecting into the air chamber a plate on which a first sealing element for closing the discharge opening is arranged, and with an elastic element which, in the activated state of the pneumatic valve, presses said sealing element against the discharge opening, wherein the actuator also has: a circuit board, an actuating element which has an actuating portion for acting on the plunger and a bending portion connected to the actuating portion and to the circuit board, and an actuator element which has a first end mechanically connected to the actuating portion and a second end mechanically and electrically connected to the circuit board, wherein the actuator element is designed to, in a non-energized state, bring the actuating element to a first state in which it presses the plunger against the supply opening, and to, in an energized state, bring the actuating element to a second state in which the actuating portion does not exert any force on the plunger, with the result that the discharge opening is closed by the first sealing element owing to the action of the elastic element.

Such a pneumatic valve is known from DE 10 2018 216 874 A1 and also from DE 10 2019 208 051 A1. However, in the case of those valves, fluid bladders or air cushions connected to the connecting opening are emptied in the activated state of the valves when there is a pressure drop at the supply opening, for example when the compressor is switched off, since there is an open connection between the connecting opening and the supply opening.

Fillable elastic cushions are used to shape seat contours in means of transport. For this purpose, the elastic cushions are usually filled with air. Electrically actuated valves are used to control the air. The cushions can also be used for a massage function by periodically filling and emptying them. For the massage function, two or more air cushions are controlled, which can be adjusted independently of one other or can remain in a filled state while other cushions are filled or vented. Due to the short holding time of the air in a cushion when being used for massage (a few seconds to approx. 10 min) compared with a contour adjustment, NO (normally open) valves are usually used for this purpose, which are in a venting position in the non-actuated state.

Mid-range and low-end vehicles are also increasingly being equipped with such systems. Therefore, an embodiment which is as cost-effective as possible is required. At the same time, vehicles are designed with a view to saving weight in order to meet environmental and consumption requirements. This results, inter alia, in a more compact construction of seats. This also means that the components installed therein must be reduced in size.

In many embodiments such as for pneumatic lumbar supports, independent 2/2-way valves are used for filling and venting for each cushion installed in a vehicle seat; consequently, each cushion requires two valve actuators. As an alternative, a combination such as 3/3-way or 3/4-way valves (likewise with two actuators) can be used for this instead of two 2/2-way valves. Shape memory alloy (SMA)

elements, which have a particularly high power density, are increasingly used as actuators for pneumatic valves.

DE 10 2013 220 563 A1 describes a solution in which the cushions are divided into multiple groups which each use a 2/2-way or 3/2-way pilot valve, thus resulting in a degree of independence-albeit limited. A further 2/2-way valve then suffices for each cushion. Cushions from groups which differ from one another can thus be independently adjusted.

EP 2 361 800 B1 discloses a pneumatic circuit which uses 3/2-way switching valves with check valves connected upstream. This makes it possible to halve the number of valve actuators required. In that context, the check valves and the switching valves are self-contained components which are connected to one another by additional connection parts. The arrangement is integrated in a compressor housing.

DE 10 2017 213 736 B3 discloses a further development thereof, in which the check valve is embodied as part of the electromagnetic switching valve and closes tightly upon actuation.

DE 10 2011 102 701 B4 describes a valve block with a pressure relief valve, which is constructed separately but with similar parts to the switching valves.

The object of the invention is to specify a pneumatic NO valve with an SMA actuator at ambient pressure and an integrated check valve for largely independent control of multiple massage air cushions, said NO valve being as simple, space-saving and cost-effective as possible.

The object is achieved by a pneumatic valve as claimed in claim 1. Advantageous developments are specified in the dependent claims.

Accordingly, in a generic pneumatic valve, a second sealing element is arranged in the air chamber, said second sealing element, in the non-energized state of the actuator element, closing the supply opening and, in the energized state of the actuator element, opening the supply opening in the event of a positive pressure difference between the pressure at the supply opening and the pressure at the connecting opening and closing the supply opening in the event of a negative pressure difference between the pressure at the supply opening and the pressure at the connecting opening. The second sealing element in the air chamber thus realizes an integrated check valve in a simple manner.

When the valve is actuated, the check valve prevents or at least minimizes a flow directed counter to the air cushion filling direction. The check valve is arranged such that it, when the valve is actuated, is drawn against the sealing seat of the supply opening by flow in the opposite direction. This movement can also be pressed lightly against the sealing seat of the supply opening by an internal restoring force, such as a material stress in an elastomer of which the second sealing element can consist. As an alternative or in addition, this may also be effected by an external restoring force, for example as a result of a spiral spring, resulting in the second sealing element being pressed lightly against the sealing seat of the supply opening.

When the pneumatic valve is not actuated, the check valve or the second sealing element is additionally pressed by a plunger onto the sealing seat of the supply opening and seals it. The second sealing element may be made of a thin and rigid or elastic material, which has a counterpart contour with respect to the sealing seat or can be brought into this form upon abutment against the sealing seat.

What is thus described is a 3/2-way valve in pot form which is actuated by an SMA actuator by means of a plunger through the exhaust-air opening. At that end of the plunger which projects into the air chamber, said plunger has a sealing element. In the activated state, the actuator releases the plunger, as a result of which the latter is then pushed by the (low) force of a restoring spring from the supply opening to the discharge opening. In this way, the first sealing element seals the sealing seat of the discharge opening.

In a first embodiment of the pneumatic valve, the second sealing element is in the form of a lamella and is anchored with one end in the wall of the air chamber. In this case, the elastic element—for example a spiral spring—may be arranged between a plate formed at that end of the plunger which projects out of the air chamber and an outer wall of the air chamber or between the plate formed at that end of the plunger which projects into the air chamber and the second sealing element.

In a second embodiment of the pneumatic valve, the second sealing element is in the form of a lamella and is arranged loosely between the supply opening and the plate formed at that end of the plunger which projects into the air chamber.

The elastic element may be arranged between this plate and the second sealing element.

In the non-activated state of the valve, the actuator presses the plunger into the lower position. In this way, the plunger exerts a force downward on the check valve and thus seals the latter. In this way, no air can flow into the cushion even in the case of high pressure in the feed air duct (see FIGS. 1 and 4). At the same time, the venting valve opens.

In the activated state, the plunger moves to the upper position and thus releases the check valve. If the pressure in the feed air duct is then greater than the pressure in the valve chamber, the check valve at least partially lifts off from the nozzle seat, and air can flow through the filling valve (see FIGS. 2 and 5).

If, in the activated state, the pressure in the feed air duct then decreases rapidly below the pressure of the previously filled cushion (as a result of the compressor being switched off or as a result of another valve being opened), a backflow from the valve chamber into the feed air duct occurs. This flow generates suction, as a result of which the check valve again abuts against the nozzle seat. This prevents a backflow, and the air is held in the valve chamber or in the cushion as long as the valve remains in the activated state (see FIGS. 3 and 6).

As an alternative, the check valve is pressed lightly onto the nozzle seat by an internal or external spring force—and thus independently of a backflow—and likewise prevents a backflow as a result. The sealing force of the check valve is applied here essentially only by the pressure difference and increases with the latter. Consequently, there is also a higher tightness in the case of a high pressure difference than in the case of a low pressure difference. Owing to the short holding times in the case of massage valves in the range of a few seconds to a few minutes, a leak that may arise as a result can be tolerated in the case of a low pressure difference.

Any pressure loss resulting from leaks can largely be compensated under the following condition: If further cushions are filled while the leak-afflicted one is being held, the feed air flows not only into the cushion to be newly filled but also into the held cushion as soon as the pressure in the feed air duct becomes greater than that in the held cushion.

In order to achieve a rapid pressure drop in the feed air, it is also possible for the valve of an empty cushion which is not being used at that moment to be briefly opened when the compressor is switched off. As a result, the residual pressure in the feed air duct escapes rapidly, thus producing the suction required for abutment of the check valve.

Figure 2:
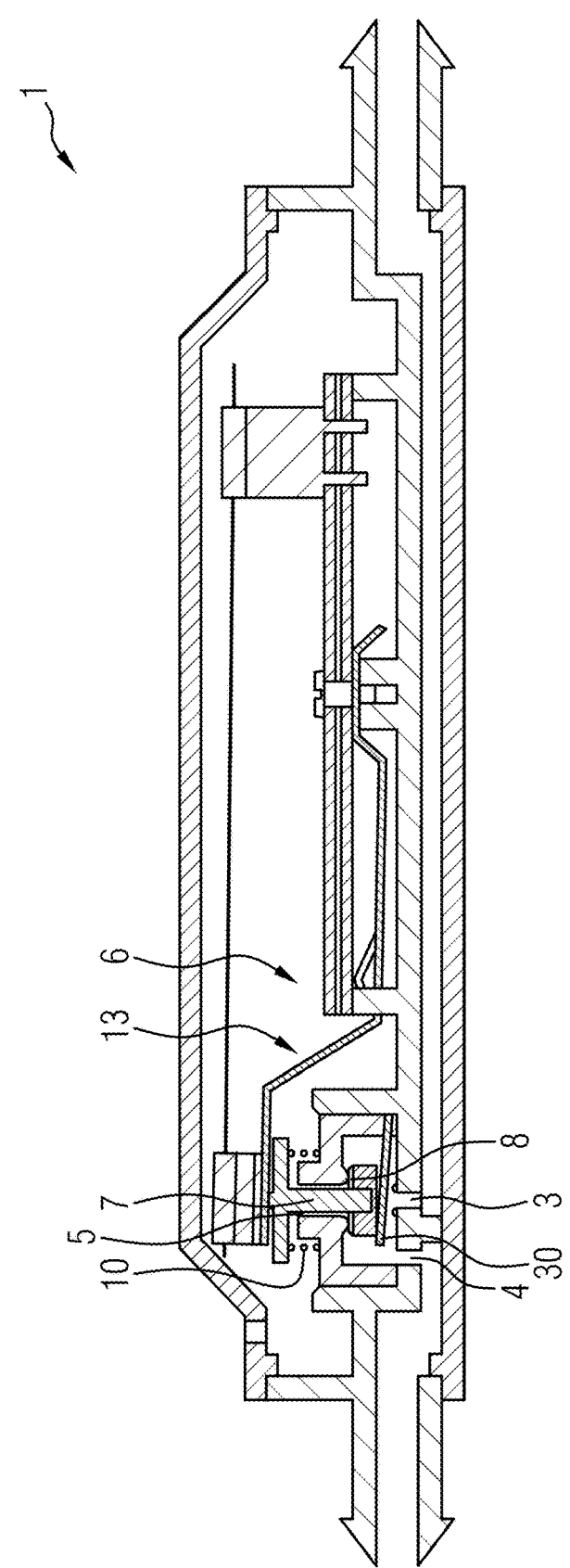
Figure 3:
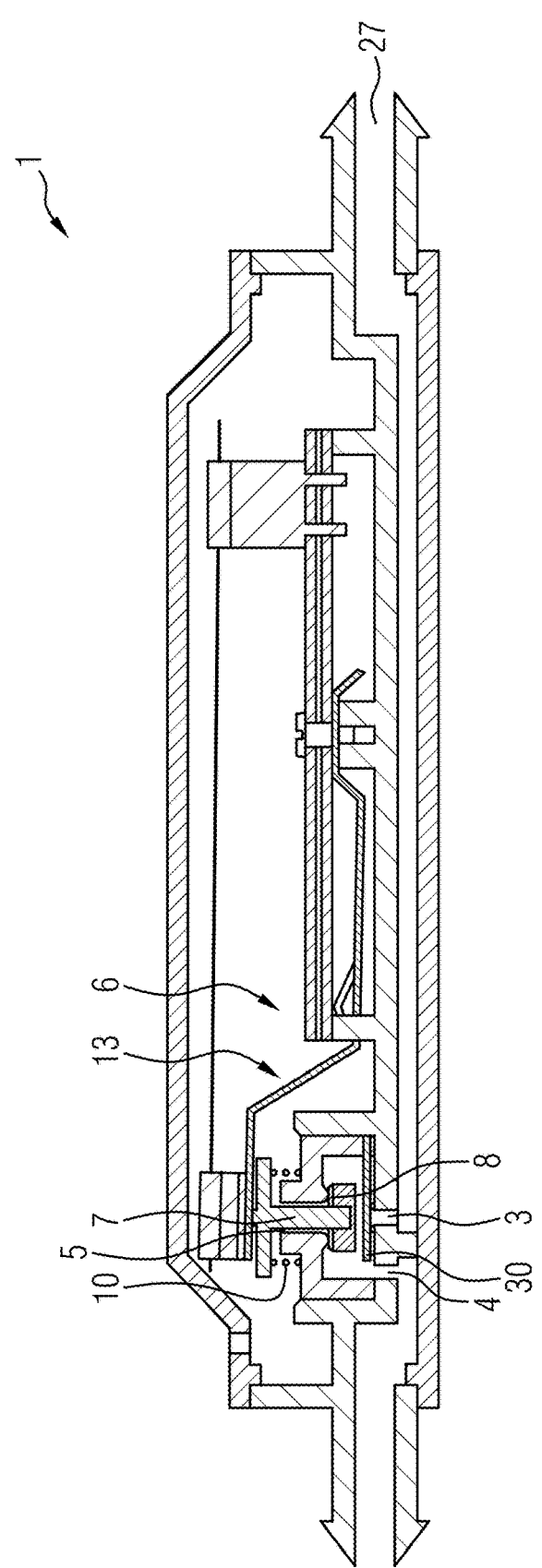
Figure 4:
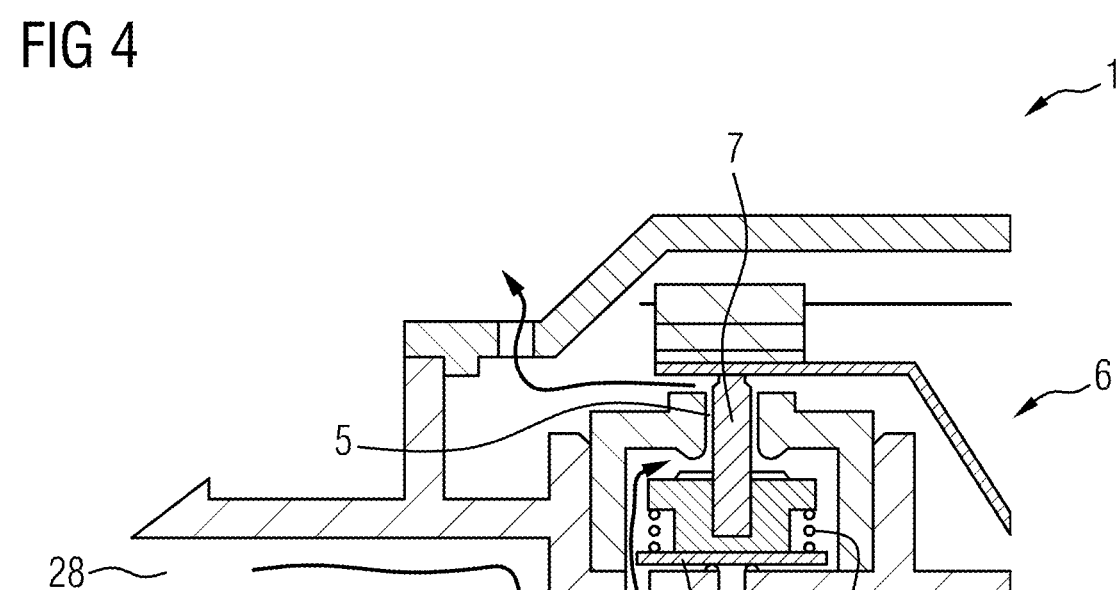
Figure 5:
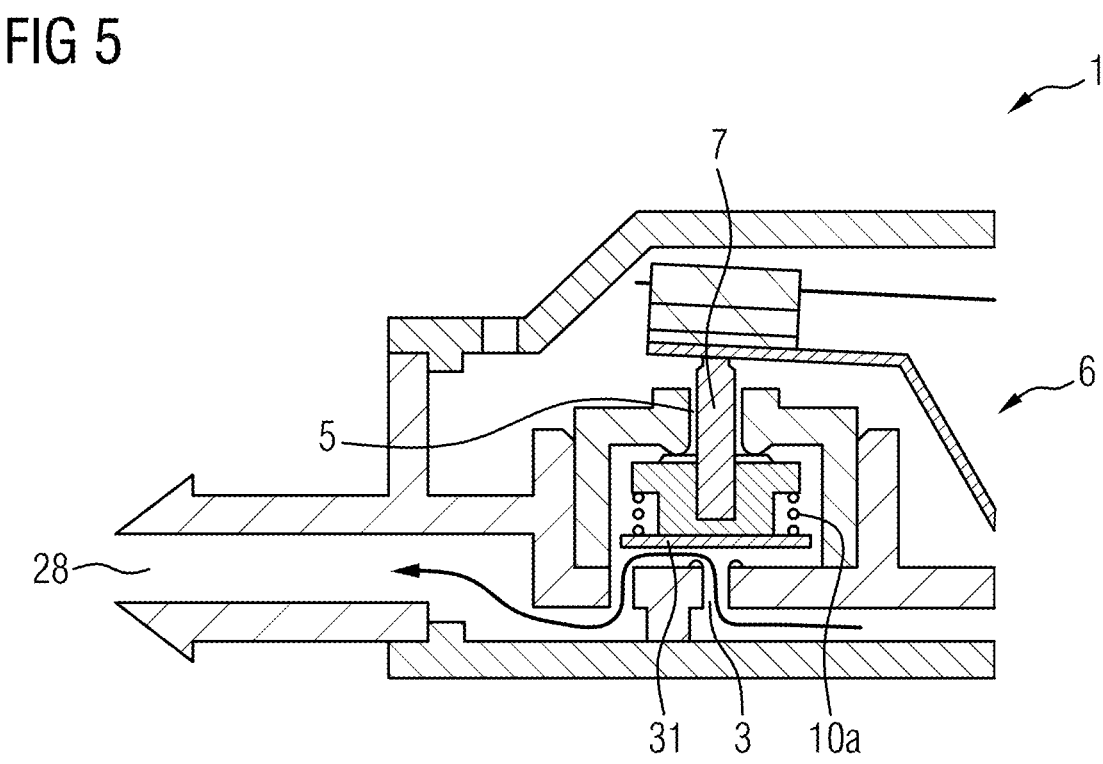
Figure 6:
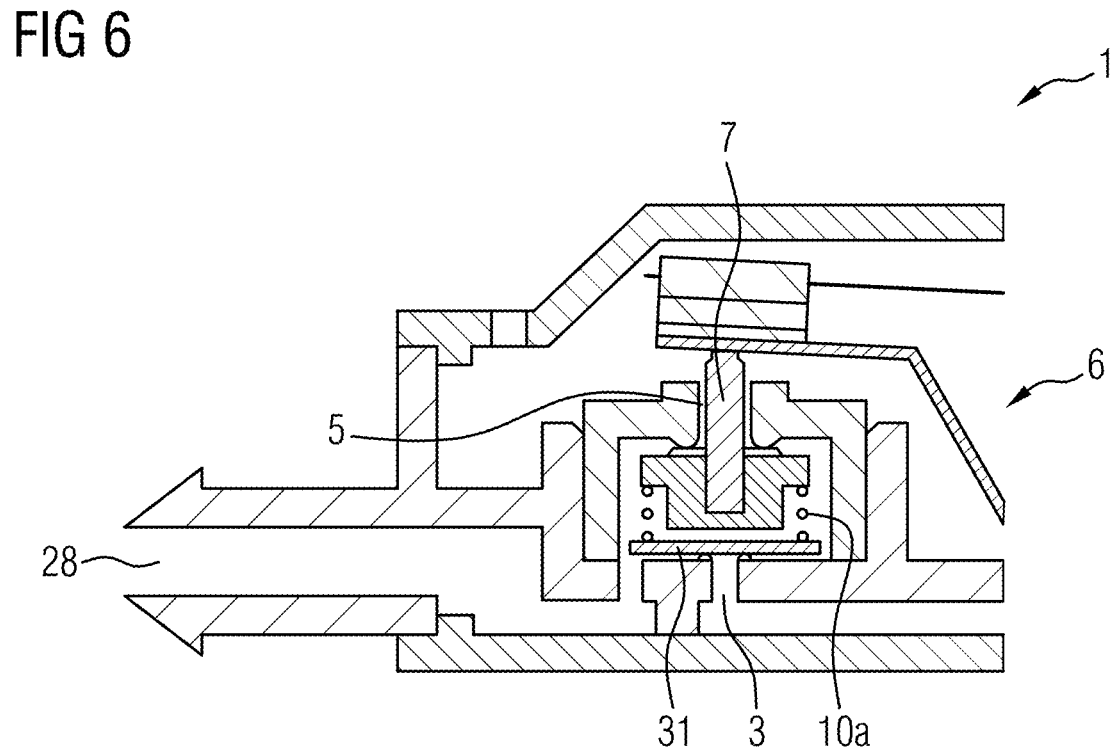

The invention will be explained in more detail below on the basis of exemplary embodiments with the aid of figures. In the figures:

FIG. 1 shows a first embodiment variant of a pneumatic valve according to the invention in a non-actuated state, FIG. 2 shows the first embodiment variant of the valve in the actuated state during a filling operation, FIG. 3 shows the first embodiment variant of the valve in the actuated state, after a filling operation, with an active restoring valve, FIG. 4 shows a second embodiment variant of a pneumatic valve according to the invention in a non-actuated state, FIG. 5 shows the second embodiment variant of the valve in the actuated state during a filling operation, and FIG. 6 shows the second embodiment variant of the valve in the actuated state, after a filling operation, with an active restoring valve.

FIG. 1 shows a cross-sectional illustration of a pneumatic valve, which is formed with a housing 1 which has a first housing part 17 in the form of a base plate in the illustrated exemplary embodiment. The housing 1 also has a second housing part 18 which is in the form of a cover, and lastly a third cup-shaped housing part 19 which is in the form of an insert part between the first and the second housing part 17, 18 and on which a supply port 27 and a connecting port 28 are integrally formed.

An air chamber 2 is formed on the third housing part 19, in that the latter has a pot-shaped molding into which a terminating part 2a is inserted as a cover of the air chamber 2. The air chamber 2 has a supply opening 3, a connecting opening 4 and a discharge opening 5. In the illustrated exemplary embodiment, the supply opening 3 and the connecting opening 4 are formed in the third housing part 19, and the discharge opening 5 is formed in the terminating part 2a terminating the air chamber 2. It is thus possible for compressed air to be routed, for example from a compressor, via the supply port 27 into the housing 1, wherein the compressed air can pass via the supply opening 3 into the air chamber 2 and from there via the connecting opening 4 and the connecting port 28 into an air cushion connectable thereto. On the other hand, compressed air from the air cushion can pass via the connecting port 28 and the connecting opening 4 into the air chamber 2 and from there via the discharge opening 5 into the interior of the housing 1, there being an opening 29 to the environment there.

In the air chamber 2, a closing element 7 with a plunger 11 and with a first sealing element 8 is formed, wherein the first sealing element 8 is fastened to or integrally formed on a plate 11a which is connected to or integrally formed on that end of the plunger 11 which projects into the air chamber 2.

A further plate 11b is fastened to or integrally formed on that end of the plunger 11 which projects out of the air chamber 2, an elastic element 10, for example in the form of a spiral spring, being supported on said further plate. The elastic element 10 is supported by way of its other end on the terminating part 2a. When the valve is activated, the elastic element 10 presses the closing element 7 and thus the first sealing element 8 against the discharge opening 5. In the activated state, it is thus not possible for any air from an air cushion connected to the connecting port 28 to escape via the air chamber 2.

In the air chamber 2, a second sealing element 30 is arranged between the plate 11a attached to the plunger 11 and the supply opening 3, and is clamped between the third housing part 19 and the terminating part 2a in the exemplary embodiment of FIG. 1. The second sealing element 30 may be embodied as a rigid or elastic lamella and acts as a leaf spring which can seal the supply opening 3 in the case of a certain force thereon. In the non-activated state of the valve shown in FIG. 1, the closing element 7 presses on the second sealing element 30 and thus presses the latter against the supply opening 3. This makes it possible for air in an air cushion connected to the connecting port 28 to escape via the non-closed discharge opening 5 through the opening 29 in the second housing part 18, thus producing an NO valve.

Moreover, an actuator 6 is arranged in the housing 1. The actuator 6 is formed with a circuit board 12 which is mounted on and mechanically connected to corresponding struts of the third housing part 19. Connected to the circuit board 12 is an actuating element 13 which has an actuating portion 14 in direct contact with the plunger 11 and has a bending portion 15 connected to the circuit board 12.

The actuator 6 also has an actuator element 16, which is preferably formed with a wire that is composed of a shape memory alloy and contracts when current supplied by a circuit (not illustrated) on the circuit board 12 is applied thereto. In the non-activated state, the actuating element 13 is preloaded in such a way that the actuating portion 14 of the actuating element 13 presses against the plunger 11 and thus presses the second sealing element 30 counter to the force of the elastic element 11 onto the supply opening 3, as a result of which the discharge opening 5 is opened.

The actuator element 16 is connected both to the actuating element 13 and to the circuit board 12 here—for example by means of crimp connections.

Advantageously, the actuator element 16 is formed above an upper side 20 of the circuit board 12 and the actuating element 13 is formed below a lower side 21 of the circuit board 12, such that a very compact construction results. In principle, the structure can also be mirror-inverted, such that the actuator element 16 comes to lie below the circuit board 12 and the actuating element 13 comes to lie above the circuit board 12.

Advantageously, an end position detection element 26 is formed on the actuating element 13, said end position detection element coming into contact with the circuit board 12 when the actuator 6 is actuated and enabling a current flow, as a result of which it is detected that the end position has been reached, with the result that the current can be switched off or at least reduced by the actuator element 16 in order not to overload the latter.

FIG. 2 shows the valve of FIG. 1 in a second, activated state, that is to say in a state in which the supply opening 3 is opened and air can flow from the supply port 27 via the connecting port 28 through the air chamber 2 into a connected air cushion.

In FIG. 2, identical parts are denoted by the same reference signs as in FIG. 1, with only the essential reference signs being shown for reasons of clarity.

As a result of activation of the actuator 6, the actuating element 13 is raised and thus the closing element 7 is likewise pushed upward by the spring force of the elastic element 10 and the discharge opening 5 is consequently closed by the first sealing element 8. The closing element 7 no longer presses on the second sealing element 30, such that the latter is raised by the air pressure and opens the supply opening 3.

Lastly, FIG. 3 shows a third state of the valve in which, when the actuator 6 is activated and thus the closing part 7 closing the discharge opening 5 functions as a check valve, the second sealing element 30 closes the supply opening 3, since the air pressure at the connecting opening 4 or the air chamber 2 is higher than at the supply opening 3 or the supply port 27.

A second embodiment of a pneumatic valve is illustrated in FIGS. 4 to 6. Here, too, identical parts are denoted by the same reference signs as in FIGS. 1 to 3.

In the second embodiment, the second sealing element 31 is in the form of a loose lamella and lies between the closing element 7 and the supply opening, in a largely freely movable manner at least between these parts.

Moreover, the elastic element 10a is now arranged between the plate 11a attached at that end of the plunger 11 which projects into the air chamber 2 and the second sealing element 31 and presses the latter, as illustrated in FIGS. 4 and 6, against the supply opening 3 or is compressed by the second sealing element 31 owing to a high pressure caused by inflowing air at the supply opening 3.

The same three states as in FIGS. 1 to 3 are illustrated in FIGS. 4 to 6, the difference being only in the embodiment of the second sealing element 31, which now no longer functions as a leaf spring, and the elastic element 10a, which now not only presses the first sealing element 8 of the closing element 7 against the discharge opening 5 when the valve is activated, but also presses the second sealing element 31 against the supply opening 3 when the pressure at the supply opening 3 becomes lower, for example because a pressure-generating compressor is switched off.

The advantages of the mentioned embodiments result from a halved number of actuators compared with an arrangement having 3/3-way NO switching valves with comparable function for massage applications, from a cost-effective, space-saving and weight-reducing presentation of a massage with holding function and from a partial compensation of pressure loss, in the event that during a longer holding time of the valve a leak occurs at the check valve, during which further cushions are intended to be filled.

The invention claimed is:

1. A pneumatic valve, comprising:
   a housing in which
      an air chamber with a supply opening for supplying compressed air into the air chamber,
      a connecting opening for connecting the air chamber to an air cushion and
      a discharge opening for discharging compressed air from the air chamber are formed,
   an actuator with a movable closing element is arranged in the housing, wherein the closing element is formed with a plunger, which projects through the discharge opening and has formed at an end thereof projecting into the air chamber a plate on which a first sealing element for closing the discharge opening is arranged, and with an elastic element which, in the activated state of the pneumatic valve, presses said first sealing element against the discharge opening, wherein the actuator also has:
      a circuit board,
      an actuating element which has an actuating portion for acting on the plunger and a bending portion connected to the actuating portion and to the circuit board, and
      an actuator element which has a first end mechanically connected to the actuating portion and a second end mechanically and electrically connected to the circuit board,
   wherein the actuator element is configured to, in a non-energized state, bring the actuating element to a first state in which it presses the plunger against the supply opening, and to, in an energized state, bring the actuating element to a second state in which the actuating portion does not exert any force on the plunger, resulting in the discharge opening is being closed by the first sealing element owing to the action of the elastic element, wherein a second sealing element is arranged in the air chamber, said second sealing element, in the non-energized state of the actuator element, closing the supply opening and, in the energized state of the actuator element, opening the supply opening in an event of a positive pressure difference between the pressure at the supply opening and the pressure at the connecting opening and closing the supply opening in the event of a negative pressure difference between the pressure at the supply opening and the pressure at the connecting opening.

2. The pneumatic valve as claimed in claim 1, in which the second sealing element is in the form of a lamella and is anchored with one end in a wall of the air chamber, and in which the elastic element is arranged between a plate formed at that end of the plunger which projects out of the air chamber and an outer wall of the air chamber.

3. The pneumatic valve as claimed in claim 1, in which the second sealing element is in the form of a lamella and is arranged loosely between the supply opening and the plate formed at that end of the plunger which projects into the air chamber.

4. The pneumatic valve as claimed in claim 3, in which the elastic element is arranged between the plate and the second sealing element.

5. The pneumatic valve as claimed in claim 3, in which the second sealing element is formed with a rigid material.

6. The pneumatic valve as claimed in claim 2, in which the second sealing element is formed with an elastic material.

7. The pneumatic valve as claimed in claim 1, in which the elastic element is formed with a spiral spring.

8. The pneumatic valve as claimed in claim 2, in which the elastic element is formed with a spiral spring.

9. The pneumatic valve as claimed in claim 3, in which the elastic element is formed with a spiral spring.

10. The pneumatic valve as claimed in claim 4, in which the elastic element is formed with a spiral spring.

11. The pneumatic valve as claimed in claim 5, in which the elastic element is formed with a spiral spring.

12. The pneumatic valve as claimed in claim 6, in which the elastic element is formed with a spiral spring.

13. The pneumatic valve as claimed in claim 1, in which the elastic element is formed with a spiral spring.

14. The pneumatic valve as claimed in claim 4, in which the second sealing element is formed with a rigid material.

15. The pneumatic valve as claimed in claim 3, in which the second sealing element is formed with an elastic material.

16. The pneumatic valve as claimed in claim 4, in which the second sealing element is formed with an elastic material.

* * * * *